United States Patent
Miyamoto et al.

(10) Patent No.: US 10,711,105 B2
(45) Date of Patent: *Jul. 14, 2020

(54) POLYIMIDE PRECURSOR RESIN COMPOSITION

(71) Applicant: ASAHI KASEI KABUSHIKI KAISHA, Tokyo (JP)

(72) Inventors: Yoshiki Miyamoto, Tokyo (JP); Yasuhito Iizuka, Tokyo (JP); Masaki Maitani, Tokyo (JP); Takayuki Kanada, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/555,779

(22) PCT Filed: Mar. 8, 2016

(86) PCT No.: PCT/JP2016/057194
§ 371 (c)(1),
(2) Date: Sep. 5, 2017

(87) PCT Pub. No.: WO2016/147958
PCT Pub. Date: Sep. 22, 2016

(65) Prior Publication Data
US 2018/0037698 A1  Feb. 8, 2018

(30) Foreign Application Priority Data
Mar. 13, 2015 (JP) .................................. 2015-050971

(51) Int. Cl.
| | | |
|---|---|---|
| *C08G 73/10* | (2006.01) | |
| *C08J 5/18* | (2006.01) | |
| *C08L 79/08* | (2006.01) | |
| *C09D 179/08* | (2006.01) | |
| *C08K 5/5415* | (2006.01) | |
| *C08L 83/04* | (2006.01) | |
| *C08G 77/46* | (2006.01) | |

(52) U.S. Cl.
CPC ......... *C08G 73/10* (2013.01); *C08G 73/1039* (2013.01); *C08G 73/1042* (2013.01); *C08G 73/1053* (2013.01); *C08G 73/1067* (2013.01); *C08G 73/1071* (2013.01); *C08J 5/18* (2013.01); *C08K 5/5415* (2013.01); *C08L 79/08* (2013.01); *C08L 83/04* (2013.01); *C09D 179/08* (2013.01); *C08G 77/46* (2013.01); *C08J 2379/08* (2013.01); *C08J 2483/06* (2013.01)

(58) Field of Classification Search
None
See application file for complete search history.

(56) References Cited

U.S. PATENT DOCUMENTS

| | | | |
|---|---|---|---|
| 2008/0138537 A1 | 6/2008 | Simone et al. | |
| 2011/0227086 A1 | 9/2011 | French | |
| 2013/0289202 A1* | 10/2013 | Miyazaki | ............. C08G 73/101 524/600 |
| 2014/0371365 A1 | 12/2014 | Bae et al. | |
| 2015/0183932 A1 | 7/2015 | Katayama et al. | |
| 2018/0037698 A1 | 2/2018 | Miyamoto et al. | |

FOREIGN PATENT DOCUMENTS

| | | |
|---|---|---|
| JP | 2004-109311 | 4/2004 |
| JP | 2007-046054 | 2/2007 |
| JP | 2010-157571 | 7/2010 |
| JP | 2010-538103 | 12/2010 |
| JP | 2014-120664 A | 6/2014 |
| JP | WO 2015122032 * | 8/2015 |
| KR | 10-2014-145512 | 12/2014 |
| TW | 201040642 A1 | 11/2010 |
| TW | I602882 B | 10/2017 |
| WO | 2009/028862 | 3/2009 |
| WO | 2013/191180 A1 | 12/2013 |
| WO | 2014/073591 A1 | 5/2014 |

OTHER PUBLICATIONS

WO 2015122032 machine translation.*
International Search Report issued in Patent Application No. PCT/JP2016/057194, dated Apr. 5, 2016.
Written Opinion of the International Searching Authority issued from Application No. PCT/JP2016/057194 dated Apr. 5, 2017.
International Preliminary Report on Patentability issued in PCT/JP2016/057194, dated Sep. 19, 2017.
Office Action issued in Taiwan Counterpart Patent App. No. 106128944, dated May 8, 2018.
Appl. Chem. Eng., vol. 23, No. 3, 266-270 (Jun. 1, 2012) Abstract.

\* cited by examiner

*Primary Examiner* — Ana L. Woodward
(74) *Attorney, Agent, or Firm* — Greenblum & Bernstein, P.L.C.

(57) ABSTRACT

This resin composition is characterized by comprising (a) 100 parts by mass of a polyimide precursor containing a structural unit represent by general formula (1) (wherein, R1 and R2 are each independently selected from a hydrogen atom, monovalent aliphatic hydrocarbons having 1-20 carbon atoms, and aromatic groups, and X1 is a tetravalent organic group having 4-32 carbon atoms), (b) 0.001-5 parts by mass of a silicone-based surfactant, and (c) an organic solvent.

12 Claims, No Drawings

POLYIMIDE PRECURSOR RESIN COMPOSITION

TECHNICAL FIELD

The present invention relates to a polyimide precursor resin composition.

The present invention further discloses a polyimide film and method for producing the same, a laminate and a method for producing the same, and a display substrate and a method for producing the same.

BACKGROUND ART

Polyimide resins are insoluble, infusible, ultra-heat resistant resins that have superior properties such as thermal oxidation resistance, heat resistance, radiation resistance, low-temperature resistance and chemical resistance. Consequently, polyimide resins are used in a wide range of fields, including electronic materials.

Application examples of polyimide resins in the field of electronic materials include insulating coating materials, insulating films, semiconductors and electrode protective films of TFT-LCD. Recently, the use of polyimide resin is being considered for use as a flexible substrate utilizing the flexibility thereof that is capable of serving as an alternative to glass substrates conventionally used in the field of display materials. Patent Document 1, for example, discloses a polyimide resin composition having little variations in film thickness along with a flexible display substrate that uses this polyimide resin composition.

In fields requiring transparency, polyimide resins have been proposed that demonstrate transparency by inhibiting the formation of charge transfer complexes by means such as introducing fluorine atoms into the resin backbone, imparting flexibility to the resin backbone or introducing bulky side chains. Patent Document 2, for example, proposes the use of a polyimide resin introduced with 2,2'-bis(trifluoromethyl)benzidine (to be referred to as "TFMB") as constituent material of a display device.

PRIOR ART DOCUMENTS

Patent Documents

Patent Document 1: International Publication No. WO 2014/073591
Patent Document 2: International Publication No. WO 2013/191180

DISCLOSURE OF THE INVENTION

Problems to be Solved by the Invention

In the case of applying a transparent polyimide resin to a flexible substrate, a resin composition containing a polyimide precursor is coated onto a glass or other substrate to form a coating film, followed by heating and drying the coating film, imidating the precursor to form a polyimide film, forming a device on the film as necessary, and separating the film to obtain the target product.

In the aforementioned process, when transporting the substrate having a coating film formed thereon to drying equipment during heating and drying thereof following formation of the coating film, it is necessary to eliminate any bending attributable to the weight of the substrate by supporting the substrate with a plurality of supports. This is a necessary measure for obtaining a film of uniform film thickness, and is particularly indispensable in the case of large substrates. At this time, local differences in heat conduction occur between areas of the coating film that contact the support and areas that do not. As a result, color unevenness occurs in the polyimide resin film at those portions that contact the supports, resulting in the problem of preventing the obtaining of a film having uniform color tone.

Compositions capable of eliminating this color unevenness have yet to be disclosed in patent documents.

The present invention was completed in consideration of the problems explained above.

Thus, an object of the present invention is to provide a polyimide precursor composition that yields a polyimide resin film having little residual stress and high uniformity of transparency that does not demonstrate color unevenness attributable to contact between a substrate and support during coating and drying.

Means for Solving the Problems

The inventors of the present invention conducted extensive research to achieve the aforementioned object. As a result, the aforementioned object was found to be able to be achieved by a composition containing a polyimide precursor having a specific structure and a silicone-based surfactant at a specific weight ratio, thereby leading to completion of the present invention.

Namely, the present invention is as indicated below.

[1] A resin composition containing:

(a) 100 parts by weight of a polyimide precursor containing a structural unit represented by the following general formula (1):

[Chemical Formula 1]

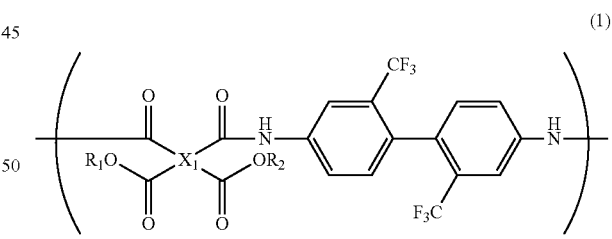

(wherein, $R_1$ and $R_2$ are respectively and independently selected from the group consisting of a hydrogen atom, monovalent aliphatic hydrocarbon group having 1 to 20 carbon atoms and aromatic group, and $X_1$ represents a tetravalent organic group having 4 to 32 carbon atoms);

(b) 0.001 parts by weight to 5 parts by weight of a silicone-based surfactant; and (c) an organic solvent).

[2] The resin composition described in [1], wherein the polyimide precursor of (a) contains both of the structural units respectively represented by the following formulas (2) and (3):

[Chemical Formula 2]

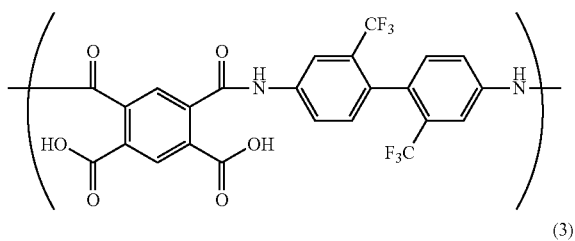

(2)

[Chemical Formula 3]

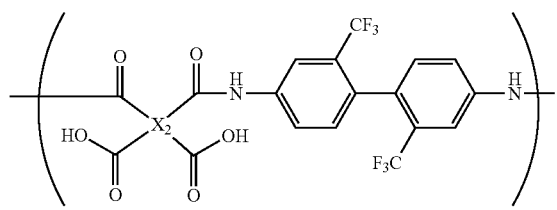

(3)

(wherein, $X_2$ represents a tetravalent organic group having 4 to 32 carbon atoms, except for the case in which $X_2$ represents a tetravalent organic group derived from pyromellitic dianhydride).

[3] The resin composition described in [2], wherein $X_2$ in general formula (3) represents a tetravalent organic group derived from at least one type of compound selected from the group consisting of 4,4'-(hexafluoroisopropylidene) diphthalic anhydride, 3,3',4,4'-biphenyltetracarboxylic dianhydride and 4,4'-oxydiphthalic dianhydride.

[4] The resin composition described in [2] or [3], wherein $X_2$ is general formula (3) represents a tetravalent organic group derived from 4,4'-(hexafluoroisopropylidene)diphthalic anhydride.

[5] The resin composition described is any of [2] to [4], wherein the molar ratio of the structural unit represented by formula (2) to the structural unit represented by formula (3) in the polyimide precursor of (a) is within the range of 90:10 to 50:50.

[6] The resin composition described is any of [1] to [5], wherein the polyimide precursor of (a) further contains a structural unit represented by the following formula (4).

[Chemical Formula 4]

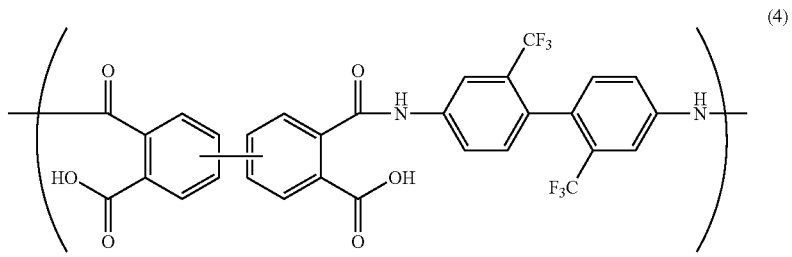

(4)

[7] A resin composition containing:
(a) 100 parts by weight of a polyimide precursor consisting of a mixture of a polyimide precursor (a1) having a structural unit represented by the following formula (2)

[Chemical Formula 4]

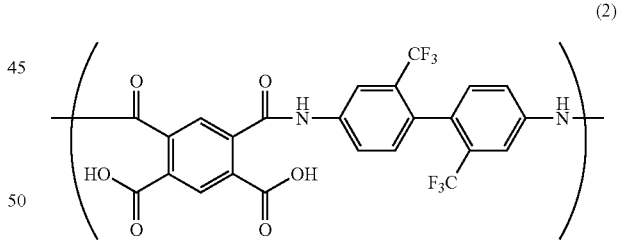

(2)

and a polyimide precursor (a2) having a structural unit represented by the following formula (5):

[Chemical Formula 5]

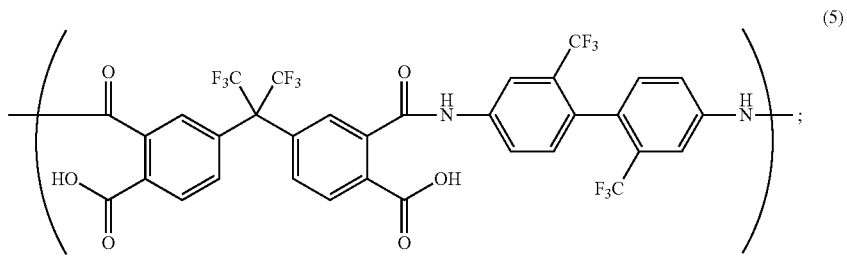

(5)

(b) 0.001 parts by weight to 5 parts by weight of a silicone-based surfactant; and (c) an organic solvent.

[8] The resin composition described in [7], wherein the molar ratio of the polyimide precursor (a1) to the polyimide precursor (a2) in the polyimide precursor of (a) is within the range of 90:10 to 50:50.

[9] The resin composition described in [7] or [8], wherein the polyimide precursor of (a) is a mixture further containing a polyimide precursor (a3) having a structural unit represented by the following formula (4).

[Chemical Formula 6]

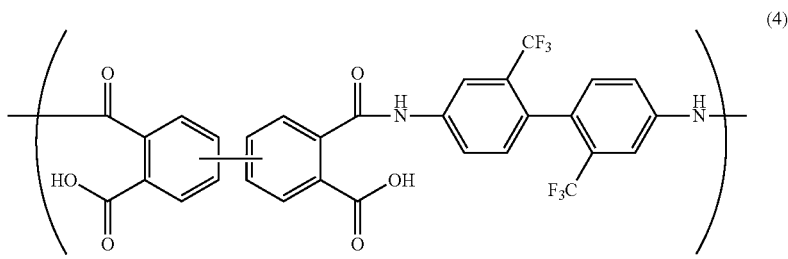

(4)

[10] The resin composition described in any of [1] to [9], wherein the silicon-based surfactant of (b) has a structural unit represented by the following formula (6):

[Chemical Formula 7]

(6)

(wherein, n represents an integer of 1 to 5).

[11] The resin composition described in any of [1] to [10], wherein the organic solvent of (c) contains a compound having a boiling point within the range of 170° C. to 270° C.

[12] The resin composition described in any of [1] to [11], wherein the organic solvent of (c) contains a compound having a vapor pressure at 20° C. of 250 Pa or less.

[13] The resin composition described in any of [1] to [12], wherein the organic solvent of (c) contains at least one type of compound selected from the group consisting of N-methyl-2-pyrrolidone, γ-butyrolactone and compounds represented by the following general formula (7):

[Chemical Formula 8]

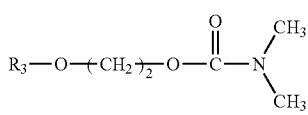

(7)

(wherein, $R_3$ represents a methyl group or n-butyl group).

[14] The resin composition described in any of [1] to [13], further containing (d) an alkoxysilane compound.

[15] A resin film containing a polyimide having a structural unit represented by the following general formula (9):

[Chemical Formula 9]

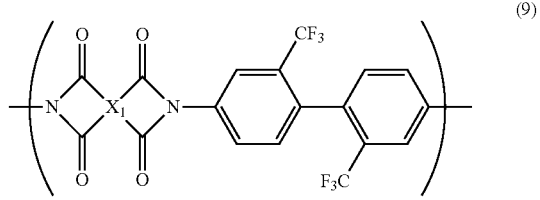

(9)

(wherein, $X_1$ represents a tetravalent organic group having 4 to 32 carbon atoms) and a silicone-based surfactant; wherein, the yellowness index (YI) based on a thickness of 15 μm is 20 or less, and absorbance at 308 nm based on a thickness of 0.1 μm is 0.1 or more.

[16] A resin film containing a structural unit represented by the following formula (10), wherein the concentration of Si atoms in the resin film as measured by XPS is 0.001 at % to 0.5 at %.

[Chemical Formula 21]

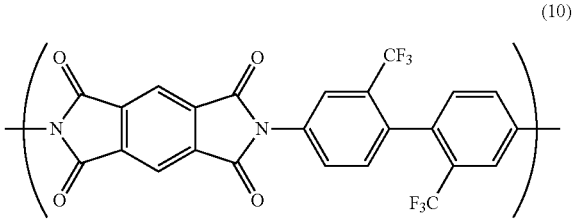

(10)

[17] A resin film containing a structural unit represented by the following general formula (10), wherein the difference between the maximum value and minimum value of YI as measured at five different points on a 10 cm×10 cm film of the resin film is 2 or less.

[Chemical Formula 22]

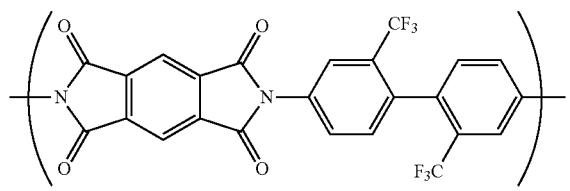

(10)

[18] A method for producing a resin film, including:
a coating step for coating the resin composition described in any of [1] to [14] on the surface of a substrate,
a solvent removal step for drying the coated resin composition and removing the solvent,
a heating step for heating the substrate and the resin composition following drying to imidate a resin precursor contained in the resin composition and form a polyimide resin film, and
a separation step for separating the polyimide resin film from the substrate.

[19] The method for producing a resin film described in [18], wherein the separation step includes a step for irradiating the substrate side with a laser followed by separating the polyimide resin film from the substrate.

[20] A method for producing a laminate, including:
a coating step for coating the resin composition described in any of [1] to [14] onto the surface of a substrate, and
a heating step for heating the substrate and the resin composition to imidate the resin precursor contained in the resin composition and form a polyimide resin film.

[21] A method for producing a display substrate, including:
a coating step for coating the resin composition described in any of [1] to [14] onto a substrate,
a heating step for heating the coated resin composition to form a polyimide resin film,
an element/circuit formation step for forming an element or circuit on the polyimide resin film, and
a separation step for separating the polyimide resin film having the element or circuit formed thereon from the substrate.

Effects of the Invention

According to the present invention, a polyimide precursor composition can be obtained that yields a uniform polyimide resin film having little residual stress that does not demonstrate color unevenness attributable to contact between a substrate and support during coating and drying.

BEST MODE FOR CARRYING OUT THE INVENTION

The following provides a detailed explanation of modes for carrying out, the present invention (to be referred to as the "embodiments"). The present invention is not limited to the following embodiments, but rather can also be carried out by making various modifications within the scope of the gist thereof.

(Polyimide Precursor (a))
First, an explanation is provided of a polyimide precursor (a) used in the present embodiment.

In the present embodiment, the polyimide precursor (a) has a structural unit represented by the following general formula (1):

[Chemical Formula 10]

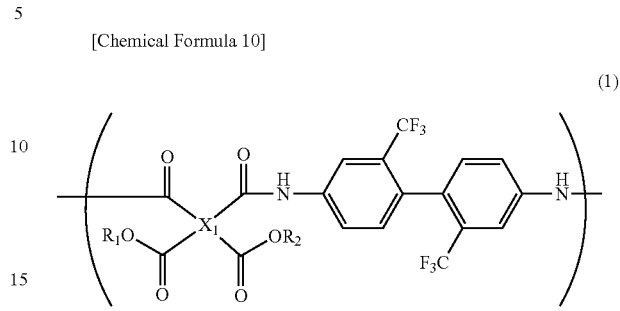

(1)

(wherein, $R_1$ and $R_2$ are respectively and independently selected from the group consisting of a hydrogen atom, monovalent aliphatic hydrocarbon group having 1 to 20 carbon atoms and aromatic group, and $X_1$ represents a tetravalent organic group having 4 to 32 carbon atoms).

The following group in formula (1):

[Chemical Formula 11]

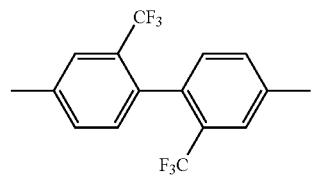

is a group derived from 2,2'-bis(trifluoromethyl)benzidine (TFMB) as a diamine, when a tetracarboxylic dianhydride is reacted with TFMB.

In the present description, a group derived from a diamine refers to a divalent group obtained by removing two amino groups from the diamine.

The aforementioned $X_1$ is a tetravalent organic group having 4 to 32 carbon atoms that is derived from a tetracarboxylic dianhydride when a tetracarboxylic dianhydride is reacted with TFMB as a diamine. In the present description, a group derived from a tetracarboxylic dianhydride refers to a tetravalent group obtained by removing two acid anhydride groups from the tetracarboxylic dianhydride.

Examples of acid dianhydrides yielding $X_1$ include aromatic tetracarboxylic dianhydrides having 8 to 36 carbon atoms (and preferably 10 to 36 carbon atoms), and alicyclic tetracarboxylic dianhydrides having 6 to 36 carbon atoms.

There are no particular limitations on the aforementioned aromatic tetracarboxylic dianhydrides, and examples thereof include 4,4'-(hexafluoroisopropylidene)diphthalic anhydride (6FDA), 5-(2,5-dioxotetrahydro-3-furanyl)-3-methyl-dichlorhexene-1,2-dicarboxylic anhydride, pyromellitic dianhydride (PMDA), 1,2,3,4-benzenetetracarboxylic dianhydride, 3,3',4,4'-benzophenonetetracarboxylic dianhydride (BTDA), 2,2'3,3'-benzophenonetetracarboxylic dianhydride, 3,3'4,4'-biphenyltetracarboxylic dianhydride (sB-PDA), 2,3-3',4-biphenyltetracarboxylic acid (αBPDA), 3,3'4,4'-diphenylsulfonetetracarboxylic dianhydride (DSDA), 2,2'3,3'-biphenyltetracarboxylic dianhydride, methylene-4,4'-diphthalic dianhydride, 1,1-ethylidene-4,4'-diphthalic dianhydride, 2,2-propylidene-4,4'-diphthalic dianhydride, 1,2-ethylene-4,4'-diphthalic dianhydride, 1,3-trimethylene-4,4'-diphthalic dianhydride, 1,4-tetramethylene-4,4'-diphthalic dianhydride, 1,5-pentamethylene-4,4'-diphthalic dianhydride, 4,4'-oxydiphthalic dianhydride (ODPA), thio-4,4'-diphthalic dianhydride, sulfonyl-4,4'-diphthalic dianhydride, 1,3-bis(3,4-dicarboxyphenyl)benzene dianhydride, 1,3-bis(3,4-dicarboxyphenoxy)benzene dianhydride, 1,4-bis(3,4-dicarboxyphenoxy)benzene dianhydride, 1,3-bis[2-(3,4-dicarboxyphenyl)-2-propyl]benzene dianhydride, 1,4-bis[2-(3,4-dicarboxyphenyl)-2-propyl]benzene dianhydride, bis[3-(3,4-dicarboxyphenoxy)phenyl] methane dianhydride, bis[4-(3,4-dicarboxyphenoxy)phenyl] methane dianhydride, 2,2-bis[3-(3,4-dicarboxyphenoxy)phenyl]propane dianhydride, 2,2-bis[4-(3,4-dicarboxyphenoxy)phenyl]propane dianhydride (BPADA), bis(3,4-dicarboxyphenoxy)dimethylsilane dianhydride, 1,3-bis(3,4-dicarboxyphenyl)-1,1,3,3-tetramethyldisiloxane dianhydride, 2,3,6,7-naphthalenetetracarboxylic dianhydride, 1,4,5,8-naphthalenetetracarboxylic dianhydride,1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride and 4,4'-biphenylbis(trimellitic monoester anhydride) (TAHQ).

There are no particular limitations on the aforementioned alicyclic tetracarboxylic dianhydrides, and examples thereof include ethylenetetracarboxylic dianhydride, 1,2,3,4-butanetetracarboxylic dianhydride, 1,2,3,4-cyclobutanetetracarboxylic dianhydride (CBDA), cyclopentanetetracarboxylic dianhydride, cyclohexane-1,2,3,4-tetracarboxylic dianhydride, cyclohexane-1,2,4,5-tetracarboxylic dianhydride (CHDA), 3,3'4,4'-bicyclohexyltetracarboxylic dianhydride, carbonyl-4,4'-bis(cyclohexane-1,2-dicarboxylic) dianhydride, methylene-4,4'-bis(cyclohexane-1,2-dicarboxylic) dianhydride, 1,2-ethylene-4,4'-bis(cyclohexane-1,2-dicarboxylic) dianhydride, 1,1-ethylidene-4,4'-bis(cyclohexane-1,2-dicarboxylic) dianhydride, 2,2-propylidene-4,4'-bis(cyclohexane)-1,2-dicarboxylic) dianhydride, oxy-4,4'-bis(cyclohexane-1,2-dicarboxylic) dianhydride, thio-4,4'-bis(cyclohexane-1,2-dicarboxylic) dianhydride, sulfonyl-4,4'-bis(cyclohexane-1,2-dicarboxylic) dianhydride, bicyclo[2,2,2]oct-7-ene-2,3,5,6-tetracarboxylic dianhydride, rel-[1S,5R,6R]-3-oxabicyclo[3,2,1]octan-2,4-dione-6-spiro-3'-(tetrahydrofuran-2',5'-dione), 4-(2,5-dioxotetrahydrofuran-3-yl)-1,2,3,4-tetrahydronaphthalene-1,2-dicarboxylic dianhydride and ethyleneglycol-bis-(3,4-dicarboxylic anhydride phenyl) ether.

The polyimide precursor (a) in the present embodiment is preferably obtained using both pyromellitic dianhydride (PMDA) and at least one type of compound selected from the group consisting of 4,4'-(hexafluoroisopropylidene) diphthalic anhydride (6FDA), 3,3',4,4'-biphenyltetracarboxylic dianhydride (BPDA) and 4,4'-oxydiphthalic dianhydride (ODPA) among the tetracarboxylic dianhydrides exemplified above. Namely, those containing both the structural units respectively represented by the following formulas (2) and (3):

[Chemical Formula 12]

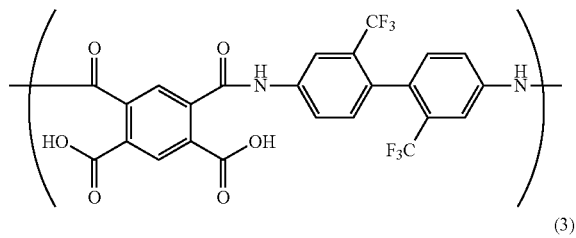

(2)

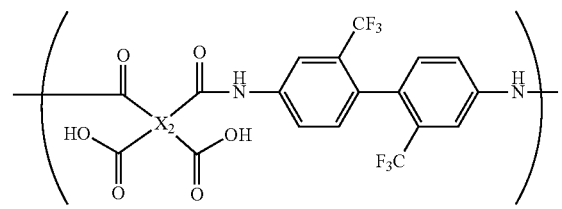

(3)

(wherein, $X_2$ represents a tetravalent organic group having 4 to 32 carbon atoms, except for the case in which $X_2$ represents a tetravalent organic group derived from PMDA) are preferable. As a result of containing a structural unit represented by the aforementioned formula (2), a decrease in the coefficient of linear expansion (CTE), improvement of chemical resistance, increasing of glass transition temperature (Tg) and improvement of mechanical elongation are observed in the resulting polyimide resin film. As a result of containing a structural unit represented by the aforementioned formula (3), a decrease in the yellowness index, decrease in birefringence, and improvement of mechanical elongation are observed in the resulting polyimide resin film. $X_2$ in formula (3) is particularly preferably a tetravalent group derived from 6FDA from the viewpoint of further enhancing total light transmittance.

The ratio (molar ratio) of structural unit to structural unit (3) in the polyimide precursor (a) is preferably such that the molar ratio of (2):(3) is within the range of 95:5 to 40:60 from the viewpoints of CTE, residual stress and yellowness index (YI) in the resulting polyimide resin. The molar ratio of (2):(3) is more preferably within the range of 90:10 to 50:50 from the viewpoint of YI, and more preferably within the range of 95:5 to 50:50 from the viewpoint of CTE and residual stress. The aforementioned ratio of the structural units (2) and (3) can be determined from, for example, the $^1$H-NMR spectra thereof.

The polyimide precursor (a) in the present embodiment may be a block copolymer or random copolymer.

The polyimide precursor (a) in the present embodiment is preferably obtained by further using for the tetracarboxylic dianhydride at least one type of compound selected from the group consisting of 3,3',4,4'-biphenyltetracarboxylic dianhydride (sBPDA) and 2,3-3',4'-biphenyltetracarboxylic acid (αBPDA). Namely, the polyimide precursor (a) particularly preferably further contains a structural unit represented by the following formula (4) in addition to structural units respectively represented by the aforementioned formulas (2) and (3).

[Chemical Formula 13]

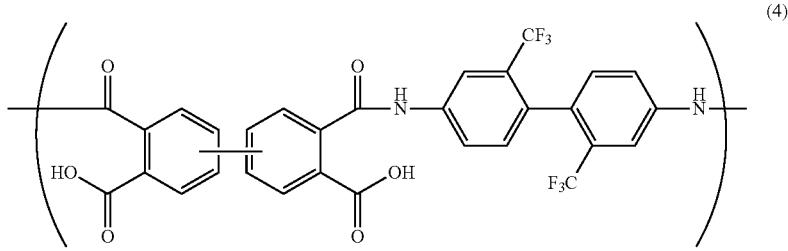

(4)

In addition to observing reduced warping of the glass substrate, a lower yellowness index, improved chemical resistance, increased Tg and improved mechanical elongation, as a result of the polyimide precursor (a) containing the structural unit represented by the aforementioned formula (4), the amount of radiant energy required in the case of separating the resin film from the substrate with a laser tends to be reduced.

The ratio of the structural unit represented by the aforementioned formula (4) is preferably 80 mol % or less and more preferably 70 mol % or less based on the total number of moles of $X_1$ in the polyimide precursor (a). This is preferable from the viewpoint of inhibiting clouding caused by liquid crystallization in the polyimide film resin obtained following imidization.

If the ratio of the structural unit represented by the aforementioned formula (4) is 5 mol % or more based on the total number of moles of $X_1$ in the polyimide precursor (a), the effect of introducing this structural unit is favorably demonstrated.

The polyimide precursor (a) in the present embodiment may further contain a structural unit represented by the following general formula (8) as necessary within a range that does not impair performance:

[Chemical Formula 14]

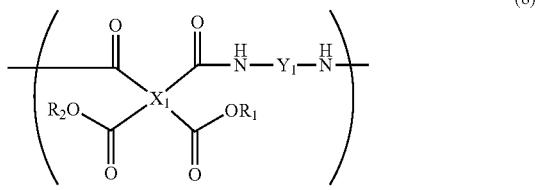

(8)

(wherein, $R_1$ and $R_2$ respectively and independently represent a hydrogen atom, a monovalent aliphatic hydrocarbon group having 1 to 20 carbon atoms or an aromatic group, $X_1$ represents a tetravalent organic group having 4 to 32 carbon atoms, and $Y_1$ represents a divalent organic group having 4 to 32 carbon atoms, except for the case in which formula (8) is equivalent to any of the aforementioned formulas (1) to (4)).

The aforementioned $Y_1$ represents a divalent organic group having 4 to 32 carbon atoms that is derived from a diamine when a tetracarboxylic dianhydride is reacted with the diamine. Examples of diamines that yield $Y_1$ include alicyclic diamines and aromatic diamines (excluding TFMB). One type or two or more types of these diamines may be used.

There are no particular limitations on the aforementioned alicyclic diamines, and examples thereof include 4,4'-diaminodicyclohexylmethane (MBCHA), 4,4'-diamino-3,3'-dimethylcyclohexylmethane, 4,4'-diamino-3,3',5,5'-tetramethylcyclohexylmethane, 1,3-diaminocyclohexane, 1,4-diaminocyclohexane (CHDA), 1-amino-3-aminomethyl-3,5,5-trimethylcyclohexane, 2,2-bis(4,4'-diaminocyclohexyl)propane, 1,3-bisaminomethyldicyclohexane, 1,4-bisaminomethylcyclohexane, 2,3-diaminobicyclo[2.2.1]heptane, 2,5-diaminobicyclo[2.2.1]heptane, 2,6-diaminobicyclo[2.2.1]heptane, 2,7-diaminobicyclo[2.2.1]heptane, 2,5-bis(aminomethyl)-bicyclo[2.2.1]heptane, 2,6-bis(aminomethyl)-bicyclo[2.2.1]heptane, 2,3-bis(aminomethyl)-bicyclo[2.2.1]heptane and 3(4),8(9)-bis(aminomethyl)-tricyclo[5.2.1.0$^{2.6}$]decane as well as hydrogenated derivatives of the aromatic diamines to be subsequently described.

There are no particular limitations on the aforementioned aromatic diamines, and examples thereof include p-phenylenediamine (PDA), m-phenylenediamine, 2,4-diaminotoluene, benzidine, 3,3'-dimethyl-4,4'-diaminobiphenyl (o-tolidine), 2,2-dimethyl-4,4'-diaminobiphenyl (m-tolidine, mTB), 3,3'-diethyl-4,4'-diaminobiphenyl, 2,2'-diethyl-4,4'-diaminobiphenyl, 3,3'-dimethoxy-4,4-diaminobiphenyl, 2,2'-dichloro-4,4'-diamino-5,5'-dimethoxybiphenyl, 2,2',5,5'-tetrachloro-4,4'-diaminobiphenyl, 4,4'-diaminodiphenylmethane, 4,4'-diaminodiphenyl ether (ODA), 3,4'-diaminodiphenyl ether, 3,3'-diaminodiphenyl ether, 3,7-diaminodimethyldibenzothiophene-5,5-dioxide, 4,4'-diaminobenzophenone, 3,3'-diaminobenzophenone, 4,4'-bis(4-aminophenyl)sulfide, 4,4'-diaminodiphenylsulfone (4,4-DAS), 4,4'-diaminobenzanilide, 1,n-bis(4-aminophenoxy)alkane, 1,3-bis[2-(4-aminophenoxyethoxy)]ethane, 9,9-bis(4-aminophenyl)fluorene, 9,9-bis(4-aminophenoxyphenyl)fluorene, 5(6)-amino-1-(4-aminomethyl)-1,3,3-trimethylindane, 1,4-bis(4-aminophenoxy)benzene (TPE-Q), 1,3-bis(4-aminophenoxy)benzene (TPE-R), 1,3-bis(3-aminophenoxy)benzene (APB), 2,5-bis(4-aminophenoxy)biphenyl (P-TPEQ), 4,4'-bis(4-aminophenoxy)biphenyl, 4,4'-bis(3-aminophenoxy)biphenyl, 2,2-bis([4-(4-aminophenoxyphenyl)]propane (BAPP), 2,2-bis(4-aminophenoxyphenyl)hexafluoropropane, bis[4-(4-aminophenoxy)phenyl]sulfone, bis[4-(3-aminophenoxy)phenyl]sulfone, 2,2-bis[4-(4-aminophenoxy)phenyl]hexafluoropropane, 4,4'-methylene-bis(2-chloroaniline), 9,10-bis(4-aminophenyl)anthracene and o-tolidinesulfone.

Among these, the use of at least one type of compound selected from the group consisting of 2,2'-dimethyl-4,4'-diaminobiphenyl (mTB), para-phenylenediamine (PDA) and 1,4-diaminocyclohexane (CHDA) is preferable from the viewpoints of decreasing the coefficient of linear expansion (CTE), increasing glass transition temperature (Tg) and improving mechanical elongation;

the use of at least one type of compound selected from the group consisting of 4,4'-diaminodiphenyl ether (ODA) and 2,2'-bis[4-(4-aminophenoxy)phenyl]propane (BAPP) is preferable from the viewpoint of chemical resistance;

the use of at least one type of compound selected from the group consisting of PDA, mTB and 3,3'-dihydroxy-4,4'-diaminobiphenyl (HAB) is preferable from the viewpoint of reducing warping of the glass substrate; and, the use of at least one type of compound selected from the group consisting of 4,4'-diaminodicyclohexylmethane (MB-CHA), CHDA and 4,4-diaminodiphenylsulfone (4,4-DAS) is preferable from the viewpoints of lowering the yellowness index and improving total light transmittance.

The aforementioned $X_1$ represents a tetravalent organic group having 4 to 32 carbon atoms that is derived from a tetracarboxylic dianhydride when the tetracarboxylic dianhydride is reacted with a diamine. Examples of acid dianhydrides that yield $X_1$ include the tetracarboxylic dianhydrides exemplified in the aforementioned general formula (1) other than PMDA, ODPA, 6FA, sBPDA and αBPDA. One type or two or more types of these tetracarboxylic dianhydrides may be used.

In the present embodiment, the ratio of the structural unit represented by the aforementioned general formula (8) is preferably 80% by weight or less and more preferably 70% by weight or less based on the total weight of the polyimide precursor (a). This is preferable from the viewpoints of decreasing the dependency of both the YI value and total light transmittance on oxygen concentration.

One type of the polyimide precursor (a) may be used or two or more types may be used as a mixture in the present embodiment. In the case of using two or more types of the polyimide precursor (a), it is preferable to use a mixture of a polyimide precursor (a1) having a structural unit represented by the aforementioned formula (2) and a polyimide precursor (a2) having a structural unit represented by the aforementioned formula (3). As a result of containing the polyimide precursor (a1), reduced CTE, improved chemical resistance, increased glass transition temperature (Tg) and improved mechanical elongation are observed in the resulting polyimide resin film. As a result of containing the polyimide precursor (a2), a lower YI value, decreased birefringence and improved mechanical bending are observed.

The structural unit represented by the aforementioned formula (3) in the polyimide precursor (a2) is preferably a structural unit represented by the following formula (5).

The polyimide precursor (a1) preferably does not have a structural unit represented by the aforementioned formula (3), while the polyimide precursor (a2) preferably does not have a structural unit represented by the aforementioned formula (2).

The mixing ratio between the polyimide precursor (a1) and the polyimide precursor (a2) in the aforementioned polyimide precursor (a) is preferably such that the ratio of structural unit (2) to structural unit (3) ((2):(3)) is within the range of 95:5 to 40:60 from the viewpoints of the CTE, residual stress and YI value of the resulting polyimide resin film. The ratio of (2):(3) is more preferably within the range of 90:10 to 50:50 from the viewpoint of YI, and the ratio of (2):(3) is more preferably within the range of 95:5 to 50:50 from the viewpoint of CTE and residual stress.

The mixing ratio between the polyimide precursor (a1) having a structural unit represented by the aforementioned formula (2) and the polyimide precursor (a2) having a structural unit represented by the aforementioned formula (3) can be determined from, for example, the $^1$H-NMR spectra thereof.

A mixture obtained by further mixing a polyimide precursor (a3) having a structural unit represented by the aforementioned formula (4) in addition to the aforementioned polyimide precursor (a1) and polyimide precursor (a2) is used particularly preferably for the polyimide precursor (a) in the present embodiment.

As a result of the polyimide precursor (a) in the present embodiment containing the polyimide precursor (a3) having a structural unit represented by the aforementioned formula (4), in addition to observing reduced warping of the glass substrate, lower yellowness index, improved chemical resistance, increased Tg and improved mechanical elongation, the amount of radiant energy required in the case of separating the resin film from the substrate with a laser tends to be reduced.

The ratio of the polyimide precursor (a3) is preferably an amount equivalent to 80 mol % or less, and more preferably 70 mol % or less, as tetracarboxylic dianhydride based on the total amount of tetracarboxylic dianhydride that composes the polyimide precursor (a) from the viewpoint of inhibiting clouding caused by liquid crystallization in the polyimide film resin obtained following imidization.

As a result of mixing and using the polyimide precursor (a3) in an amount equivalent to 5 mol % or more as tetracarboxylic dianhydride based on the total amount tetracarboxylic dianhydride that composes the polyimide precursor (a3), the effect of using this precursor is favorably demonstrated.

The molecular weight of the polyimide precursor (a) in the present embodiment is such that the weight average molecular weight (Mw) is preferably 10,000 to 500,000,

[Chemical Formula 15]

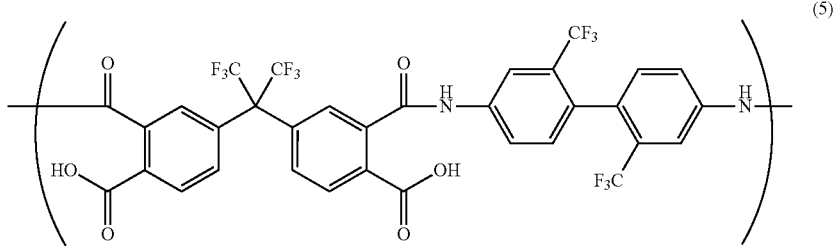

(5)

more preferably 10,000 to 300,000, and particularly preferably 20,000 to 200,000. If the weight average molecular weight is 10,000 or more, the formation of cracks in the resin film formed by heating a coated resin composition tends to be suppressed, thereby making this preferable. If the weight average molecular weight is 500,000 or less, it becomes easier to control the weight average molecular weight during synthesis of polyamic acid while also facilitating the obtaining of a resin composition of suitable viscosity, thereby making this preferable. The weight average molecular weight (Mw) in the present embodiment is a value determined in terms of standard polystyrene using gel permeation chromatography.

The number average molecular weight (Mn) of the polyimide precursor (a) in the present embodiment is preferably 3,000 to 250,000, more preferably 5,000 to 200,000, even more preferably 7,000 to 180,000 and particularly preferably 10,000 to 150,000. A molecular weight Mn of 3,000 or more is preferable from the viewpoints of favorably obtaining heat resistance and strength (such strong elongation), while a molecular weight Mn of 250,000 or less is preferable from the viewpoint of favorably obtaining solubility in solvent and from the viewpoint of enabling coating at a desired thickness during processing such as coating without the occurrence of bleeding. The molecular weight Mn is preferably 5,000 or more from the viewpoint of obtaining high mechanical elongation. The number average molecular weight (Mn) in the present embodiment is a value determined in terms of standard polystyrene using gel permeation chromatography.

In the present embodiment, a portion of the polyimide precursor (a) may be imidated. Imidization of a portion of the polyimide precursor (a) makes it possible to improve stability of the viscosity of a solution of the polyimide precursor. The range of the imidization ratio is preferably within the range of 5% to 70% from the viewpoint of maintaining balance between solubility of the polyimide precursor (a) in solution and storage stability of the solution.

(Polyimide Precursor (a) Production Method)

The polyimide precursor of the present invention can be produced by a conventionally known synthesis method. For example, the polyimide precursor can be obtained by adding a prescribed amount of a tetracarboxylic dianhydride or mixture thereof to a diamine solution obtained by dissolving a prescribed amount of TFMB in a solvent followed by stirring for a prescribed amount of time at a prescribed reaction temperature.

The solvent may be heated as necessary when dissolving a monomer component therein. The reaction temperature is preferably −30° C. to 200° C., more preferably 20° C. to 180° C., and particularly preferably 30° C. to 100° C. After stirring at the aforementioned reaction temperature, stirring is continued at room temperature (20° C. to 25° C.) or at a suitable reaction temperature, and the endpoint of the reaction is taken to be the point at which a desired molecular weight has been reached as determined by GPC. The aforementioned reaction can normally be completed in 3 hours to 10 hours.

In the present embodiment, stability of viscosity during room temperature storage of a solution containing the polyimide precursor (a) and a solvent can be improved by adding an esterification agent in the manner of N,N-dimethylformamide dimethyl acetal or N,N-dimethylformamide diethyl acetal to the polyimide precursor (a) obtained in the manner described above followed by heating to esterify all or a portion of the carboxyl groups present in the polyimide precursor (a). In addition to the method described above, these ester-modified polyimide precursors can be obtained by, for example, preliminarily reacting a monovalent alcohol with the aforementioned tetracarboxylic dianhydride in an amount equal to one equivalent based on the acid anhydride groups thereof followed by reacting with a dehydration condensation agent such as thionyl chloride or dicyclohexylcarbodiimide and then subjecting to a condensation reaction with a diamine.

In a preferred aspect of the present embodiment, the aforementioned solvent is the organic solvent (c) present in the resin composition.

There are no particular limitations on the aforementioned solvent provided it is capable of dissolving diamines, tetracarboxylic acids and the resulting polyamic acids. Specific examples of such solvents include aprotic solvents, phenol-based solvents, ether-based solvents and glycol-based solvents.

More specifically, examples of aprotic solvents include amide-based solvents such as N,N-dimethylformamide (DMF), N,N-dimethylacetoamide (DMAc), N-methyl-2-pyrrolidone (NMP), N-methylcaprolactam, 1,3-dimethylimidazolidinone, tetramethyl urea or compounds represented by the following general formula (7):

[Chemical Formula 16]

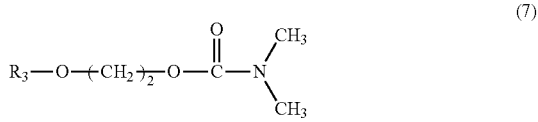

(7)

(wherein, $R_3$ represents a methyl group or n-butyl group); lactone-bases solvents such as γ-butyrolactone or γ-valerolactone; phosphorus-containing amide-based solvents such as hexamethylphosphoric amide or hexamethylphosphorous triamide; sulfur-based solvents such as dimethyl sulfone, dimethyl sulfoxide or sulfolane; ketone-based solvents such as cyclohexanone or methylcyclohexanone; tertiary amine-based solvents such as picoline or pyridine; and ester-based solvent such as 2-methoxy-1-methylethyl acetate. Compounds represented by the aforementioned general formula (7) in which $R_3$ represents a methyl group are commercially available as Ekuamido M100 (trade name, Idemitsu Kosan Co., Ltd.), while compounds in which $R_3$ represents an n-butyl group are commercially available as Ekuamido B100 (trade name, Idemitsu Kosan Co., Ltd.).

Examples of phenol-based solvents include phenol, o-cresol, m-cresol, p-cresol, 2,3-xylenol, 2,4-xylenol, 2,5-xylenol, 2,6-xylenol, 3,4-xylenol and 3,5-xylenol. Examples of ether-based and glycol-based solvents include 1,2-dimethoxyethane, bis(2-methoxyethyl) ether, 1,2bis(2-methoxyethoxy) ethane, bis[2-(2-methoxyethoxy)ethyl] ether, tetrahydrofuran and 1,4-dioxane.

The solvent used in the present embodiment is preferably a compound having a boiling point within the range of 60° C. to 300° C., more preferably a compound having a boiling point within the range of 140° C. to 280° C., and particularly preferably a compound having a boiling point within the range of 170° C. to 270° C., at normal pressure. Containing a solvent having a boiling point of 300° C. or lower is preferable since the drying step tends to require a shorter period of time, while containing a solvent having a boiling point of 60° C. or higher is preferable since this tends to inhibit the formation of bubbles in the resin film since the surface of the resin film obtained in the drying step is more uniform. Thus, the content ratio of a compound having a boiling point within the aforementioned ranges in the solvent is preferably as high as possible, and can be, for example, 50% by weight or more, preferably 70% by weight or more and more preferably 80% by weight or more based on the total weight of the solvent. Most preferably, all of the aforementioned solvent (100% by weight) consists only of a compound having a boiling point within the aforementioned ranges.

A solvent boiling point of 170° C. to 270° C. and a solvent vapor pressure at 20° C. of 250 Pa or less is preferable from the viewpoints of favorable solubility and inhibition of edge cissing during coating. More specifically, examples of such solvents include N-methyl-2-pyrrolidone, γ-butyrolactone, Ekuamido M100 and Ekuamido B100. One type of these solvents may be used alone or two or more types may be used as a mixture.

(Silicone-Based Surfactant (b))

Next, an explanation is provided of the silicone-based surfactant (b) used in the present embodiment.

In the present embodiment, there are no particular limitations on the silicone-based surfactant provided it has a siloxane (—Si—O—Si—) structure as a non-polar moiety. The silicone-based surfactant is preferably a silicone-based surfactant having 1 to 1,000 —Si—O—Si— bonds as non-polar moieties in a molecule thereof and 1 to 100 polyether groups, hydroxyl groups, carboxyl groups, ester groups or sulfa groups as polar moieties in a molecule thereof.

In the present embodiment, the number of —Si—O—Si— bonds as non-polar moieties in a molecule of the silicone-based surfactant (b) is:

preferably 1 or more in order to demonstrate a difference in polarity with the polyimide precursor (a), and preferably 1,000 or less, more preferably 500 or less, and even more preferably 100 or less from the viewpoint of forming a uniform film with the polyimide precursor (a).

In the present embodiment, the number of polyether groups, hydroxyl groups, carboxyl groups, ester groups or sulfo groups in a molecule of the silicone-based surfactant (b) is:

preferably 1 or more from the viewpoint of affinity with an inorganic substrate, and preferably 100 or less, more preferably 70 or less and even more preferably 50 or less from the viewpoint of heat resistance.

In the present embodiment, the silicone-based surfactant (b) particularly preferably has a polyether group structure represented by the following formula (6):

[Chemical Formula 17]

(6)

(wherein, n represents an integer of 1 to 5) since there tends to be less color unevenness caused by contact with a support.

Examples of these silicon-based surfactants (b) include organopolysiloxanes modified with hydrophilic groups, such as polyoxyethylene (POE)-modified organopolysiloxane, polyoxyethylene-polyoxypropylene (POE-POP)-modified organopolysiloxane, POE-sorbitan-modified organopolysiloxane, POE-glyceryl-modified organopolysiloxane or POE-polyester-modified organopolysiloxane.

Specific examples include organosiloxane polymers KF-640, KF-642, KF-643, KP341, X-70-092, X-70-093, KBM303, KBM403, KBM803 (all trade names of products manufactured by Shin-Etsu Chemical Co., Ltd.), SH-28PA, SH-190, SH-193, SZ-6032, SF-8428, DC-57, DC-190 (all trade names of products manufactured by Dow Corning Toray Silicone Co., Ltd.), SILWET, L-77, L-7001, FZ-2105, FZ-2120, FZ-2154, FZ-2164, FZ-2166, L-7604 (all trade names of products manufactured by Unitika Ltd.), DBE-814, DBE-224, DBE-621, CMS-626, CMS-222, KF-352A, KF-354L, KF-355A, KF-6020, DBE-821, DBE-712 (all trade names of products manufactured by Gelest Inc.), BYK-307, BYK-310, BYK-313, BYK-378, BYK-333 (all trade names of products manufactured by Byk-Chemie Japan, K.K.), Polyflow KL-100, Polyflow KL-401, Polyflow KL-402, Polyflow KL-700 and Glanol (all trade names of products manufactured by Kyoei Chemical Co., Ltd.).

The incorporated amount of the silicone-based surfactant (b) in the present embodiment is preferably 0.001 part by weight to 5 parts by weight and more preferably 0.001 part by weight to 3 parts by weight based on 100 parts by weight of the polyimide precursor (a) in the resin composition. The addition of 0.001 part by weight or more of the silicone-based surfactant (b) makes it possible to obtain a uniform resin film with little color unevenness, while addition of 5 parts by weight or less makes it possible to inhibit whitening of the resin film caused by aggregation of the surfactant.

(Organic Solvent (c))

There are no particular restrictions on the organic solvent (c) used in the present embodiment provided it is able to dissolve the aforementioned polyimide precursor (a), silicone-based surfactant (b) and an alkoxysilane compound (d) to be subsequently described in the case of the use thereof. A solvent able to be used when producing the aforementioned polyimide precursor (a) can be used for this organic solvent. Thus, the organic solvent (c) preferably contains a compound having a boiling point within the range of 170° C. to 270° C., preferably contains a compound having a vapor pressure at 20° C. of 250 Pa or less, and preferably contains at least one type of compound selected from the group consisting of N-methyl-2-pyrrolidone, γ-butyrolactone and a compound represented by the aforementioned general formula (6).

The organic solvent (c) may be the same as or different from the solvent used when producing the polyimide precursor (a).

The usage ratio of the organic solvent (c) is preferably an amount such that the solid component concentration in the resin composition is 3% by weight to 50% by weight. The organic solvent (c) is preferably used in amount at which the viscosity (25° C.) of the resin composition is adjusted to 500 mPa·s to 100,000 mPa·s.

(Alkoxysilane Compound (d))

The resin composition in the present embodiment can contain an alkoxysilane compound (d) as another component thereof. Containing the alkoxysilane compound (d) in the resin composition makes it possible to impart adequate adhesiveness between a polyimide resin film obtained from the resin composition and a substrate used in the production process of a device such as a flexible device, which in addition to improving coatability (by inhibiting uneven streak) of the resin composition, makes it possible to lower the dependency of the YI value of the resulting polyimide resin film on oxygen concentration during curing.

In the present embodiment, the alkoxysilane compound (d) is preferably contained at 0.01% by weight to 20% by weight based on a value of 100% by weight for the polyimide precursor (a). Favorable adhesiveness with a substrate can be obtained by making the content of the alkoxysilane compound (d) to be 0.01% by weight or more based on a value of 100% by weight for the polyimide precursor (a). The content of the alkoxysilane compound (d) is preferably 20% by weight or less from the viewpoint of storage stability of the resin composition. The content of the alkoxysilane compound (d) is more preferably 0.02% by weight to 15% by weight, even more preferably 0.05% by weight to 10% by weight, and particularly preferably 0.1% by weight to 8% by weight based on a value of 100% by weight for the polyimide precursor (a).

Examples of the aforementioned alkoxysilane compound (d) include 3-ureidopropyltriethoxysilane, bis(2-hydroxyethyl)-3-aminopropyltriethoxysilane, 3-glycidoxypropyltrimethoxysilane, γ-aminopropyltrimethoxysilane, γ-aminopropyltripropoxysilane, γ-aminopropyltributoxysilane, γ-aminoethyltriethoxysilane, γ-aminoethyltripropoxysilane, γ-aminoethyltributoxysilane, γ-aminobutyltriethoxysilane, γ-aminobutyltrimethoxysilane, γ-aminobutyltripropoxysilane, γ-aminobutyltributoxysilane, phenylsilanetriol, trimethoxyphenylsilane, trimethoxy(p-tolyl)silane, diphenylsilanediol, dimethoxydiphenylsilane, diethoxydiphenylsilane, dimethoxydi-p-tolylsilane, triphenylsilanol and alkoxysilane compounds represented by each of the following structures, and one or more types selected therefrom are used preferably.

In the present embodiment, a portion of the polyimide precursor (a) may be subjected to dehydration imidization by carrying out heat treatment to a degree that does not cause the polymer to precipitate by, for example, heating for 5 minutes to 2 hours at 130° C. to 200° C. The imidization ratio can be controlled by controlling the heating temperature and heating time. Partial imidization of the polyimide precursor (a) makes it possible to improve stability of the viscosity of the resin composition when storing at room temperature. A range of the imidization ratio of 5% to 70% is preferable from the viewpoint of maintaining balance between solubility of the polyimide precursor (a) in a solution of the resin composition and storage stability of the solution as previously described. In the present embodiment, although the heat treatment stage may be before or after the addition of the silicone-based surfactant (b) and other components, heat treatment is more preferably carried out at a stage prior to the addition thereof.

The moisture content of the resin composition according to the present embodiment is preferably 3,000 ppm by

[Chemical Formula 18]

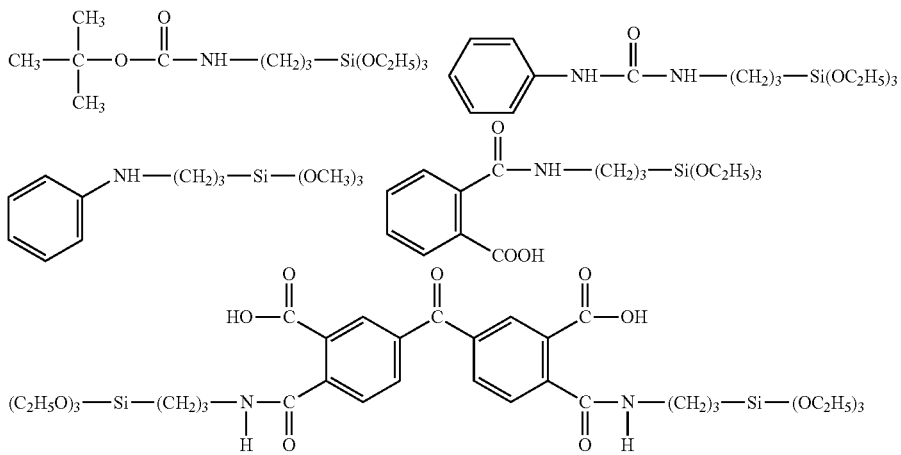

(Resin Composition Production Method)

Although there are no particular limitations on the method used to produce a resin composition in the present embodiment, the resin composition can be produced according to, for example, the method indicated below.

In the case the solvent used when synthesizing the polyimide precursor (a) and the organic solvent (c) are the same, the resin composition can be produced by adding the silicon-based surfactant (b) and one or more types of other components as necessary to a synthesis solution of the polyimide precursor (a) followed by stirring and mixing within a temperature range of 0° C. to 100° C. A suitable device such as a three-one motor equipped with a stirring blade (Shinto Scientific Co., Ltd.) or planetary centrifugal mixer can be used during this stirring and mixing.

In the case the solvent used when synthesizing the polyimide precursor (a) and the organic solvent (c) are different, the resin composition can be produced by removing the solvent present in the synthesis solution of the synthesized polyimide precursor by a suitable method such as re-precipitation or solvent distillation to isolate the polyimide precursor (a), followed by adding the organic solvent (c) to re-dissolve the polyimide precursor (a), adding the silicone-based surfactant (b) and other components as necessary, and stirring and mixing within a temperature range of 0° C. to 100° C.

weight or less, more preferably 1,000 ppm by weight or less, and even more preferably 500 ppm by weight or less from the viewpoint of stability of viscosity when storing the resin composition.

The viscosity of a solution of the resin composition according to the present embodiment at 25° C. is preferably 500 mPa·s to 200,000 mPa·s, more preferably 2,000 mPa·s to 100,000 mPa·s, and particularly preferably 3,000 mPa·s to 30,000 mPa·s. The viscosity of the solution can be measured using an E-type viscometer (such as Visconice HD manufactured by Toki Sangyo Co., Ltd.). A solution viscosity of 500 mPa·s or more is preferable since coating tends to be easier during film formation, and a solution viscosity of 200,000 mPa·s or less tends to facilitate stirring during synthesis of the polyimide precursor and preparation of the resin composition.

Even the viscosity of the solution has become high during synthesis of the polyimide precursor (a), a resin composition having a viscosity that facilitates handling can be obtained by diluting the solution by adding solvent following completion of the reaction.

The resin composition according to the present embodiment can be preferably used to form a transparent substrate of a display device such as a liquid crystal display, organic electroluminescence display, field emission display or electronic paper. More specifically, the resin composition according to the present embodiment can be used to form a substrate such as the substrate of a thin film transistor (TFT), substrate of a color filter or substrate of a transparent conductive film (ITO, indium thin oxide).

<Resin Film and Production Method of Same>

Another aspect of the present invention provides a resin film (polyimide resin film) formed from the previously described resin composition.

Still another aspect of the present invention provides a method for producing a resin film from the previously described resin composition.

The method for producing a resin film of the present embodiment includes:

a step for coating the previously described resin composition onto the surface of a substrate (coating step), a step for removing the solvent by drying the coated resin composition (solvent removal step), a step for forming a polyimide resin film by heating the resin composition and imidating the polyimide precursor contained in the resin composition (heating step), and a step for separating the polyimide resin film from the substrate (separation step).

There are no particular limitations on the substrate provided it has sufficient heat resistance for withstanding the drying temperature in a subsequent step and has favorable detachability. Examples thereof include, glass (such as alkali glass) substrates; silicon wafers; resin substrates such as those made of PET (polyethylene terephthalate), OPP (oriented polypropylene), polyethylene glycol terephthalate, polyethylene glycol naphthalate, polycarbonate, polyimide, polyamide-imide, polyetherimide, polyether ether ketone, polyether sulfone, polyphenylene sulfone or polyphenylene sulfide; and metal substrates such as those made of stainless steel, alumina, copper or nickel.

A coating method using, for example, a doctor blade coater, air knife coater, roll coater, rotary coater, flow coater, die coater or bar coater, a coating method such as spin coating, spray coating or dip coating, or a printing technology represented by screen printing and gravure printing, can be applied for the coating method in the coating step.

In the present embodiment, the coating thickness is suitably adjusted corresponding to the desired thickness of the resin film and the content of the polyimide precursor (a) in the resin composition. The film thickness after removing the solvent is preferably about 1 µm to 1,000 µm. Although the coating step is preferably carried out at room temperature, it may also be carried out by heating to a temperature range of 40° C. to 80° C. for the purpose of facilitating workability by lowering the viscosity of the resin composition.

The solvent removal step may be carried out after the aforementioned coating step or the process may proceed directly to the subsequent heating step while omitting the solvent removal step.

This solvent removal step is carried out for the purpose of removing the organic solvent (c) present in the resin composition. In the case of carrying out the solvent removal step, a suitable device such as a hot plate, compartment dryer or conveyor dryer can be used. The solvent removal step is preferably carried out 80° C. to 200° C. and more preferably carried out at 100° C. to 150° C. The duration of the solvent removal step is preferably 1 minute to 10 hours and more preferably 3 minutes to 1 hour. A coating film containing a polyimide precursor is formed on the substrate by carrying out the procedure as described above.

The heating step is then carried out. In addition to removing organic solvent remaining in the resin film after going through the aforementioned solvent removal step, the heating step allows the obtaining of a film composed of polyimide by allowing the polyimide precursor in the coating film to undergo an imidization reaction.

This heating step can be carried out using a device such as an inert gas oven, hot plate, compartment dryer or conveyor dryer. This step may be carried out simultaneous to the aforementioned solvent removal step or both steps may be carried out successively.

Although the heating step may be carried out in an air atmosphere, it is recommended to be carried out in an inert gas atmosphere from the viewpoints of safety as well as the transparency and YI value of the resulting polyimide resin film. Examples of inert gases include nitrogen and argon.

Although the heating temperature in the heating step is suitably set corresponding to the type of the organic solvent (c), it is preferably 250° C. to 550° C. and more preferably 300° C. to 450° C. If this temperature is 250° C. or higher, imidization tends to proceed adequately, while if the temperature is 550° C. or lower, the resulting polyimide resin film tends to have high transparency and high heat resistance. The heating time is preferably about 0.5 hours to 3 hours.

In the present embodiment, the oxygen concentration of the ambient atmosphere in the aforementioned heating step is preferably 2,000 ppm by weight or less, more preferably 100 ppm by weight or less, and even more preferably 10 ppm by weight or less from the viewpoints of enhancing transparency and decreasing the YI value of the resulting polyimide resin film.

In the drying step, it is necessary to support the substrate at multiple locations with suitable supports in order to make the substrate flat and make the thickness of the resulting resin film uniform particularly when the substrate is of a large size. In this case, the drying environment differs between those areas contacted by the supports and those areas not contacted by the support. Consequently, convection current attributable to local differences in the drying rates within the coating film is generated resulting in the occurrence of color unevenness in the ultimately obtained resin film. In the present embodiment, color unevenness does not occur in the ultimately obtained resin film even if the drying environment differs locally according to the presence or absence of contact between the substrate and the supports. This is presumed to be the result of convection current attributable to differences in the drying rate being inhibited due to hydrophilic moieties (such as ether moieties) of the silicon-based surfactant (b) in the resin composition gathering at amic acid moieties of the polyimide precursor (a) and silicone moieties gathering at the interface between the coating film and ambient atmosphere (such as air or nitrogen).

The problem of color unevenness had not been actualized in conventional polyimide resins having low transparency. In the present embodiment, a resin film free of color unevenness is obtained for a resin film having high transparency.

As will be understood from the examples and comparative examples to be subsequently described, a fluorine-based surfactant is not effective for inhibiting color unevenness for a polyamic acid containing TFMB for the structural unit thereof in order to improve transparency, and is achieved with a silicone-based surfactant.

A separation step for separating the resin film from the substrate following the aforementioned heating step may be necessary depending on the application and purpose of the polyimide resin film. This separation step is preferably carried out after having cooled the resin film on the substrate to about room temperature to 50° C.

Examples of this separation step include the aspects (1) to (4) indicated below.

(1) A method consisting of separating the polyimide resin by obtaining a laminate composed of a substrate and a polyimide resin film formed on the substrate according to the aforementioned method, followed by irradiating the laminate with a laser from the substrate side and subjecting the interface between the substrate and polyimide resin film to ablation processing.

Examples of types of the aforementioned laser include a solid (YAG) laser and a gas (UV excimer) laser. A spectrum having a wavelength of 308 nm, for example, is used preferably (see, for example, JP-T 2007-512568 or JP-T 2012-511173).

(2) A method consisting of separating the polyimide resin film, after having formed a release layer on the substrate prior to coating the resin composition on the substrate followed by obtaining a laminate, in which the release layer and the polyimide resin film are laminated on the substrate in that order.

Examples of methods for forming the release layer include a method that uses Parylene® (Specialty Coating Systems, Inc.) or tungsten oxide, and a method that uses a vegetable oil-based, silicone-based, fluorine-based or alkyd-based release agent (see, for example, JP-A 2010-67957 or JP-A 2013-179306).

This method (2) may also be used in combination with the laser irradiation of the aforementioned method (1).

(3) A method for obtaining a polyimide resin using an etchable metal substrate for the substrate by obtaining a laminate composed of the metal substrate and a polyimide resin film formed on the metal substrate, followed by etching the metal substrate with an etchant.

Copper (a specific example of which is the electrolytic copper foil "DFF" manufactured by Mitsui Mining & Smelting Co., Ltd.) or aluminum can be used for the aforementioned metal. Ferric chloride in the case of copper or dilute hydrochloric acid in the case of aluminum can be used for the etchant.

(4) A method consisting of obtaining a laminate composed of a substrate and a polyimide resin film formed on the substrate according to the aforementioned method, followed by affixing an adhesive film to the surface of the polyimide resin film, separating the adhesive film/polyimide resin film from the substrate, and then separating the polyimide resin film from the adhesive film.

Among these separation methods, method (1) or (2) is appropriate from the viewpoints of the difference in refractive index between the top and bottom sides, YI value and elongation of the resulting resin film, while method (1) is more appropriate from the viewpoint of the difference in refractive index between the top and bottom sides of the resulting resin film.

In method (3), the YI value of the resulting resin film tends to become large and elongation tends to decrease in the case copper is used for the substrate. This is thought to be due to the effect of copper ions.

Although there are no particular limitations thereon, the thickness of the resin film obtained according to the aforementioned method is preferably within the range of 1 μm to 200 μm and more preferably within the range of 5 μm to 100 μm.

The YI value of the resin film in the present embodiment based on a thickness of 15 μm is 20 or less, there is no in-plane color unevenness, and absorbance at 380 nm based on a thickness of 0.1 μm is 0.1 or more. These properties are preferably realized by imidating by going through a heating step for 5 minutes to 10 hours in a nitrogen atmosphere (and more preferably, a nitrogen atmosphere having an oxygen concentration of 2,000 ppm or less) preferably at 250° C. to 550° C. and more preferably at 300° C. to 450° C.

The resin film in the present embodiment is a film containing a polyimide, obtained by subjecting the polyimide precursor (a) contained in the previously described resin composition to thermal imidization, and the silicone-based surfactant (b) contained in the resin composition. Thus, the resin film contains a polyimide having a structural unit represented by the following general formula (9):

[Chemical Formula 19]

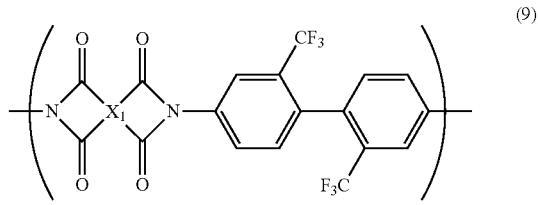

(9)

(wherein, $X_1$ represents a tetravalent organic group having 4 to 32 carbon atoms) and a silicone-based surfactant, and as previously described, the YI value based on a thickness of 15 μm is preferably 20 or less, there is preferably no in-plane color unevenness, and absorbance at 308 nm based on a thickness of 0.1 μm is preferably 0.1 or more.

This resin film may also further contain the previously described alkoxysilane compound (d) in addition to the aforementioned polyimide and silicone-based surfactant.

The resin film in the present embodiment is a resin film containing a structural unit represented by the following general formula (10), wherein the difference between the maximum value and minimum value of YI, as measured at five different points by molding the resin film into a film measuring 10 cm×10 cm, is 2 or less.

[Chemical Formula 23]

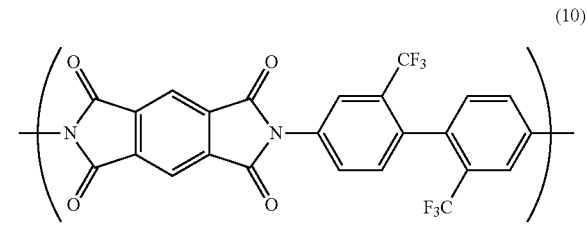

(10)

The difference between the maximum value of YI and the YI value is preferably 1.5 or less and particularly preferably 1.0 or less.

As a result of making the difference between the maximum and minimum values of YI to be 2 or less, favorable performance can be demonstrated when producing a flexible device to be subsequently described. The YI value in this case is based on a thickness of 15 μm.

The method used to form the film into a film measuring 10 cm×10 cm preferably consists of cutting a resin film formed at a large size to a size measuring 10 cm×10 cm.

The resin in the present embodiment is a resin film containing a structural unit represented by the aforementioned general formula (10), wherein the concentration of Si atoms in the resin film as measured by XPS is 0.001 at % to 0.5 at %.

The concentration of Si atoms can be determined by the XPS measurement method to be subsequently described. The concentration of Si atoms is preferably 0.001 at % to 0.5 at % and more preferably 0.001 at % to 3 at %.

<Laminate and Production Method of Same>

Another aspect of the present invention provides a laminate containing a substrate and a polyimide resin film formed from the previously described resin composition on the surface of the substrate.

Still another aspect of the present invention provides a method for producing the aforementioned laminate.

The laminate in the present embodiment can be obtained by laminate production method that includes:

a step for coating the previously described resin composition on the surface of a substrate (coating step), and a step forming a polyimide resin film by heating the coated resin composition and imidating the polyimide precursor contained in the resin composition (heating step).

The aforementioned laminate production method can be carried out, for example, in the same manner as the previously described resin film production method with the exception of not carrying out the separation step.

This laminate can be preferably used, for example, in the production of a flexible device.

The following provides a more detailed explanation thereof.

In the case of forming a flexible display, glass is used for the substrate, a flexible substrate is formed thereon, a barrier layer is formed on the flexible substrate as necessary that prevents the entry of water vapor and oxygen, and a TFT is further formed thereon. The step for forming the TFT on the flexible substrate is typically carried out at a temperature over a wide range of 150° C. to 650° C. In reality, however, a TFT-IGZO (InGaZnO) oxide semiconductor or TFT (α-Si-TFT or poly-Si-TFT) is required to be formed using an inorganic material at a temperature of about 250° C. to 450° C. in order to realize the desired level of performance.

Since the resin film according to the present embodiment can be produced to be free of color unevenness even at those locations contacted by supports while also having a uniform color tone in the case of having supported the substrate with multiple supports in order to eliminate bending caused by the weight of the substrate particularly when coating onto a large substrate as previously described, a flexible display can be viewed without any color difference in the case of using the resin film as a flexible substrate.

Thus, another aspect of the present invention provides a display substrate.

Still another aspect of the present invention provides a method for producing the aforementioned display substrate.

The method for producing a display substrate in the present embodiment includes:

a step for coating the previously described resin composition onto the surface of a substrate (coating step), a step for forming a polyimide resin film by heating the resin composition and imidating the polyimide precursor contained in the resin composition (heating step), a step for forming an element or circuit on the polyimide resin film (element/circuit formation step), and a step for separating the polyimide resin film having the element or circuit formed thereon from the substrate (separation step).

In the aforementioned method, the coating step, heating step and separation step can each be carried out in the same manner as in the previously described resin film production method.

The element/circuit formation step can be carried out according to a method known among persons with ordinary skill in the art.

The resin film according to the present embodiment is preferably used in applications in which the use of existing polyimide films is limited due to yellowing thereof, and particularly in applications such as colorless, transparent substrates for flexible displays or protective films for color filters. The resin film according to the present embodiment can also be used in fields requiring absence of color, transparency and low birefringence, such as diffuser sheets or coating films in protective films or TFT-LCD (such as the inter-layers, gate insulating films or liquid crystal alignment films of TFT-LCD), ITO substrates for touch panels, or alternative cover glass resin substrates for smartphones. Application of the polyimide according to the present embodiment to a liquid crystal alignment film enables the production of TFT-LCD having a high aperture ratio and high contrast ratio.

A resin film and laminate produced using the resin composition according to the present embodiment can be applied, for example, as a semiconductor insulating film, TFT-LCD insulating film or electrode protective film, and can be used particularly preferably as a substrate in the production of flexible devices. Examples of flexible devices applicable to the resin film and laminate according to the present embodiment include flexible displays, flexible solar cells, flexible touch panel electrode substrates, flexible illumination and flexible batteries.

EXAMPLES

Although the following provides a detailed explanation of the present invention through examples thereof, the present invention is not limited to these examples.

Various evaluations in the examples and comparative examples were carried out in the manner described below.

<Measurement of Weight Average Molecular Weight>

Weight average molecular weight (Mw) and number average molecular weight (Mn) were measured under the following conditions by gel permeation chromatography (GPC).

A solution obtained by adding and dissolving 24.8 mmol/L of lithium bromide monohydrate (Wako Pure Chemical Industries, Ltd., purity: 99.5%) and 63.2 mmol/L of phosphoric acid (Wako Pure Chemical Industries, Ltd., for high-performance liquid chromatography) into N,N-dimethylformamide (Wako Pure Chemical Industries, Ltd., for high-performance liquid chromatography) immediately prior to measurement, was used for the solvent. A calibration curve for calculating weight average molecular weight was prepared using standard polystyrene (Tosoh Corp.).

Column: Shodex KD-806M (Showa Denko K.K.)
Flow rate: 1.0 mL/min
Column temperature: 40° C.
Pump: PU-2080 Plus (Jasco Corp.)
Detector: RI 2031 Plus (RI: differential refractometer, Jasco Corp.) and UV-2075 Plus (UV-VIS: UV-visible spectrometer (Jasco Corp.)

<Evaluation of Color Unevenness at Support Sites>

Each resin composition prepared in the examples and comparative examples was coated onto non-alkali glass substrate of 10 cm square using a bar coater so that the film thickness after curing was 15 μm. Four supports in the form of cylindrical quartz supports having a diameter of 0.5 cm were placed in an oven set to 80° C. followed by placing the glass substrate coated with the aforementioned resin composition thereon and pre-baking for 30 minutes. Subsequently, the oxygen concentration in the oven was adjusted to 10 ppm by weight or less and heat-curing treatment (curing treatment including imidization, to apply similarly hereinafter) was carried out for 1 hour at 350° C. to fabricate a laminate having a polyimide resin film formed on a glass substrate. Those areas on the surface of this laminate that were on the supports during drying and heating were observed visually and evaluated for color unevenness based on the criteria indicated below.
- A: No color unevenness on the rings at any of the four locations (extremely good)
- B: Color unevenness on the rings at one of the four locations (good)
- C. Color unevenness of the rings at 2 to 3 of the four locations (poor)
- D: Unable to be evaluated (extremely poor)

<Evaluation of Residual Stress>

Each resin composition prepared in the examples and comparative examples was coated onto a 6-inch silicon wafer, having a thickness of 625 μm±25 μm, and for which warpage had been measured in advance, with a bar coater followed by pre-baking for 30 minutes at 80° C. Subsequently, a silicon wafer having a polyimide resin film having a thickness of 15 μm was fabricated by carrying out heat-curing treatment for 60 minutes at 350° C. using a vertical curing oven (Model VF-2000B, Koyo Lindbergh Co.) and adjusting the oxygen concentration in the oven to 10 ppm, by weight or less.

The warpage of this wafer was measured using a residual stress measurement device (Model FLX-2320, KLA-Tencor Corp.) followed by evaluating the amount of residual stress present between the silicon wafer and resin film based on the criteria indicated below.
- A. Residual stress of greater than −5 MPa to 15 MPa (evaluation of residual stress: Extremely good)
- B: Residual stress of greater than 15 MPa to 25 MPa (evaluation of residual stress: Good)
- C. Residual stress of greater than 25 MPa or −5 MPa or less (evaluation of residual stress: Poor)

<Evaluation of Yellowness Index (YI Value)>

Each resin composition prepared in the examples and comparative examples was coated onto a 6-inch silicon wafer substrate provided with an alumina deposition layer on the surface thereof (thickness: 0.1 μm) so that the film thickness after curing was 15 μm, followed by pre-baking for 30 minutes at 80° C. Subsequently, a wafer having a polyimide resin film formed thereon was fabricated by carrying out heat-curing treatment for 1 hour at 350° C. using a vertical curing oven (Model VF-2000B, Koyo Lindbergh Co.) and adjusting the oxygen concentration in the oven to 10 ppm by weight or less.

This wafer was immersed in a dilute aqueous hydrochloric acid solution to separate the polyimide resin film and obtain a resin film.

The YI value (based on a thickness of 15 μm) was measured for the resulting polyimide resin film with the SE600 Spectrophotometer manufactured by Nippon Denshoku Industries Co., Ltd. using a D65 illuminant. The resin film was cut to 10 cm×10 cm and YI values were measured at five different points followed by determining the average value thereof along with the difference between the maximum value and minimum value.

<Evaluation of Laser Separation Energy>

Each resin composition prepared in the examples and comparative examples was coated onto a glass substrate (thickness: 0.7 mm) so that the film thickness after curing was 15 μm followed by pre-baking for 30 minutes at 80° C. Subsequently, a laminate consisting of the glass substrate and a polyimide resin film was fabricated by carrying out heat-curing treatment for 1 hour at 350° C. using a vertical curing oven (Model VF-2000B, Koyo Lindbergh Co.) and adjusting the oxygen concentration in the oven to 10 ppm by weight or less.

The laminate obtained in the manner described above was irradiated from the substrate side with an excimer laser (wavelength: 308 nm) while incrementally increasing the radiant energy followed by evaluating the minimum radiant energy capable of causing separation of the polyimide as the laser separation energy.

<Measurement of Si Atom Concentration by XPS>

After obtaining a resin film using the same method as that used when evaluating YI value as previously described, measurement was carried out using the Escalab 250 manufactured by Thermo Fisher Scientific Inc. and using mono. Alkα at 15 kV×10 mA for the excitation source. The concentration of Si atoms was detected in at % units by reading the peak value of binding energy in the vicinity of 96 eV to 108 eV.

<Preparation of Polyimide Precursor Solution>

PRODUCTION EXAMPLE 1

N-methyl-2-pyrrolidone (NMP, moisture content: 250 ppm by weight, amount equivalent to a solid component content of 15% by weight immediately after opening an 18 L drum) as a solvent and 49.0 mmol of 2,2'-bis(trifluoromethyl)benzidine (TFMB) as a diamine were placed in a 500 ml separable flask for which the inside thereof had been replaced with nitrogen followed by stirring to dissolve the TFMB in the NMP. Next, 50 mmol of pyromellitic dianhydride (PMDA) as a tetracarboxylic dianhydride were added followed by stirring and polymerizing for 4 hours at 80° C. in the presence of flowing nitrogen. Subsequently, after allowing to cool to room temperature, NMP was added to adjust the solution viscosity to 51,000 mPa·s and obtain an NMP solution (also referred to as varnish) P-1 of a polyimide precursor (polyamic acid). The weight average molecular weight (Mw) of the resulting polyamic acid was 180,000.

PRODUCTION EXAMPLES 2 TO 13

Polyimide precursor solutions (to also be referred to as varnishes) P-2 to P-15 were obtained in the same manner as Production Example 1 with the exception of changing the types and amounts of solvent and tetracarboxylic dianhydride used in Production Example 1 as shown in Table 1.

The weight average molecular weights (Mw) of each of the resulting polyimide precursors are shown in Table 1 along with the monomer compositions thereof.

TABLE 1

| | Monomer | | | | | | | Weight average molecular weight (Mw) | Polyimide precursor |
|---|---|---|---|---|---|---|---|---|---|
| | Tetracarboxylic dianhydride | | | | | Diamine | | | |
| | PMDA (molar ratio) | 6FDA (molar ratio) | sBPDA (molar ratio) | ODPA (molar ratio) | TAHQ (molar ratio) | TFMB (molar ratio) | Solvent | | |
| Man. Ex. 1 | 100 | — | — | — | — | 98 | NMP | 180,000 | P-1 |
| Man. Ex. 2 | 90 | 10 | — | — | — | 98 | NMP | 185,000 | P-2 |
| Man. Ex. 3 | 85 | 15 | — | — | — | 98 | NMP | 190,000 | P-3 |
| Man. Ex. 4 | 70 | 30 | — | — | — | 98 | NMP | 190,000 | P-4 |
| Man. Ex. 5 | 50 | 50 | — | — | — | 98 | NMP | 200,000 | P-5 |
| Man. Ex. 6 | 30 | 70 | — | — | — | 98 | NMP | 201,000 | P-6 |
| Man. Ex. 7 | 80.8 | 14.2 | 5 | — | — | 98 | NMP | 180,000 | P-7 |
| Man. Ex. 8 | 76.5 | 13.5 | 10 | — | — | 98 | NMP | 175,000 | P-8 |
| Man. Ex. 9 | — | 100 | — | — | — | 98 | NMP | 210,000 | P-9 |
| Man. Ex. 10 | — | — | 100 | — | — | 98 | NMP | 170,000 | P-10 |
| Man. Ex. 11 | 85 | 15 | — | — | — | 98 | DMAc | 160,000 | P-11 |
| Man. Ex. 12 | 85 | 15 | — | — | — | 98 | M100 | 190,000 | P-12 |
| Man. Ex. 13 | 85 | 15 | — | — | — | 98 | B100 | 190,000 | P-13 |
| Man. Ex. 14 | 80.8 | — | — | 19.2 | — | 98 | NMP | 170,000 | P-14 |
| Man. Ex. 15 | 85.2 | — | — | — | 14.8 | 98 | NMP | 175,000 | P-15 |

The abbreviations of the solvents and monomers shown in Table 1 respectively have the following meanings. A "-" sign in the monomer column indicates that the component corresponding to that column was not used.

[Solvents]

NMP: N-methyl-2-pyrrolidone (moisture content: 250 ppm by weight immediately after opening 18 L drum)

DMAc: N,N-dimethylacetoamide (general-purpose grade (not dehydrated grade), moisture content: 2,300 ppm)

M100: Ekuamido M100 (trade name, Idemitsu Kosan Co., Ltd., moisture content: 260 ppm)

B100: Ekuamido B100 (trade name, Idemitsu Koran Co., Ltd., moisture content: 270 ppm)

[Tetracarboxylic Dianhydrides]

PMDA: Pyromellitic dianhydride

6FDA: 4,4'-(hexafluoroisopropylidene)diphthalic anhydride sBPDA: 3,3'-4,4'-biphenyltetracarboxylic dianhydride ODPA: 4,4'-oxydiphthalic anhydride TAHQ: 4,4'-biphenylbis(trimellitic monoester anhydride)

[Diamine]

TFMB: 4,4'-diamino-2,2'-bis(trifluoromethyl)biphenyl

EXAMPLE 1

A surfactant (DBE-821, trade name, silicon-based surfactant manufactured by Gelest Inc.) was dissolved in Varnish P-1 of the polyimide precursor obtained in Production Example 1 at a ratio of 0.05 parts by weight to 100 parts by weight of the polyimide precursor followed by filtering with a 0.1 μm filter to prepare a resin composition.

Various properties of the resulting resin composition were measured and evaluated.

The prepared composition of the resin composition is summarized in Table 2 while the results obtained from measurements and evaluations are summarized in Table 3. The Si atom concentration of the resin film was 0.05 at %.

EXAMPLES 2 TO 21 AND COMPARATIVE EXAMPLES 1 TO 9

Resin compositions were prepared in the same manner as Example 1 with the exception of formulating the polyimide precursor and surfactant contained in the varnish. used in the aforementioned Example 1 according to the respective compositions shown in Table 2.

Various properties of the resulting resin compositions were measured and evaluated.

In Example 14, a silane coupling agent of the type and amount shown in Table 2 was used in addition to the polyimide precursor and silicone-based surfactant.

The results obtained are summarized in Table 3.

In Comparative Example 9, unable to evaluate the yellowness index (YI) means that, as a result of the silicone-based surfactant aggregating on the surface, the resulting film ended up undergoing whitening that prevented evaluation of the yellowness index.

The Si atom concentrations of the resin films of Comparative Examples 1 to 8 were 0 at % in all cases.

TABLE 2

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | Solvent | NMP | NMP | NMP | NMP | NMP | NMP | NMP | NMP | NMP | NMP |
| Polyimide | P-1 | 100 | — | — | — | — | — | — | — | 85 | 76.5 |
| Precursor | P-2 | — | 100 | — | — | — | — | — | — | — | — |
| (parts by weight) | P-3 | — | — | 100 | — | — | — | — | — | — | — |
| | P-4 | — | — | — | 100 | — | — | — | — | — | — |
| | P-5 | — | — | — | — | 100 | — | — | — | — | — |
| | P-6 | — | — | — | — | — | 100 | — | — | — | — |
| | P-7 | — | — | — | — | — | — | 100 | — | — | — |
| | P-8 | — | — | — | — | — | — | — | 100 | — | — |
| | P-9 | — | — | — | — | — | — | — | — | 15 | 13.5 |
| | P-10 | — | — | — | — | — | — | — | — | — | 10 |

TABLE 2-continued

|  |  |  |  |  |  |  |  |  |  |  |
|---|---|---|---|---|---|---|---|---|---|---|
|  | P-11 | — | — | — | — | — | — | — | — | — | — |
|  | P-12 | — | — | — | — | — | — | — | — | — | — |
|  | P-13 | — | — | — | — | — | — | — | — | — | — |
|  | P-14 | — | — | — | — | — | — | — | — | — | — |
|  | P-15 | — | — | — | — | — | — | — | — | — | — |
| Surfactant (parts by weight) | DBE821 | 0.05 | 0.05 | 0.05 | 0.05 | 0.1 | 0.15 | 0.08 | 0.02 | 0.05 | 0.02 |
|  | DBE621 | — | — | — | — | — | — | — | — | — | — |
|  | DBE714 | — | — | — | — | — | — | — | — | — | — |
|  | DBE224 | — | — | — | — | — | — | — | — | — | — |
|  | Polyflow | — | — | — | — | — | — | — | — | — | — |
|  | BYK313 | — | — | — | — | — | — | — | — | — | — |
|  | F171 | — | — | — | — | — | — | — | — | — | — |
| Silane Coupling Agent (parts by weight) | BT | — | — | — | — | — | — | — | — | — | — |

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
|  | Solvent | DMAc | M100 | B100 | NMP | NMP | NMP | NMP | NMP | NMP | NMP |
| Polyimide Precursor (parts by weight) | P-1 | — | — | — | — | — | — | — | — | — | — |
|  | P-2 | — | — | — | — | — | — | — | — | — | — |
|  | P-3 | — | — | — | — | 100 | 100 | 100 | 100 | 100 | — |
|  | P-4 | — | — | — | — | — | — | — | — | — | — |
|  | P-5 | — | — | — | — | — | — | — | — | — | — |
|  | P-6 | — | — | — | — | — | — | — | — | — | — |
|  | P-7 | — | — | — | 100 | — | — | — | — | — | — |
|  | P-8 | — | — | — | — | — | — | — | — | — | — |
|  | P-9 | — | — | — | — | — | — | — | — | — | — |
|  | P-10 | — | — | — | — | — | — | — | — | — | — |
|  | P-11 | 100 | — | — | — | — | — | — | — | — | — |
|  | P-12 | — | 100 | — | — | — | — | — | — | — | — |
|  | P-13 | — | — | 100 | — | — | — | — | — | — | — |
|  | P-14 | — | — | — | — | — | — | — | — | — | 100 |
|  | P-15 | — | — | — | — | — | — | — | — | — | — |
| Surfactant (parts by weight) | DBE821 | 0.1 | 0.05 | 0.05 | 0.05 | — | — | — | — | — | 0.05 |
|  | DBE621 | — | — | — | — | 0.15 | — | — | — | — | — |
|  | DBE714 | — | — | — | — | — | 0.1 | — | — | — | — |
|  | DBE224 | — | — | — | — | — | — | 0.15 | — | — | — |
|  | Polyflow | — | — | — | — | — | — | — | 0.15 | — | — |
|  | BYK313 | — | — | — | — | — | — | — | — | 0.5 | — |
|  | F171 | — | — | — | — | — | — | — | — | — | — |
| Silane Coupling Agent (parts by weight) | BT | — | — | — | 0.05 | — | — | — | — | — | — |

|  |  | Example 21 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
|  | Solvent | NMP | NMP | NMP | NMP | NMP | NMP | NMP | NMP | NMP | NMP |
| Polyimide Precursor (parts by weight) | P-1 | — | 100 | — | — | — | — | — | — | — | — |
|  | P-2 | — | — | 100 | — | — | — | — | — | — | — |
|  | P-3 | — | — | — | 100 | — | — | — | — | 100 | 100 |
|  | P-4 | — | — | — | — | 100 | — | — | — | — | — |
|  | P-5 | — | — | — | — | — | 100 | — | — | — | — |
|  | P-6 | — | — | — | — | — | — | 100 | — | — | — |
|  | P-7 | — | — | — | — | — | — | — | 100 | — | — |
|  | P-8 | — | — | — | — | — | — | — | — | — | — |
|  | P-9 | — | — | — | — | — | — | — | — | — | — |
|  | P-10 | — | — | — | — | — | — | — | — | — | — |
|  | P-11 | — | — | — | — | — | — | — | — | — | — |
|  | P-12 | — | — | — | — | — | — | — | — | — | — |
|  | P-13 | — | — | — | — | — | — | — | — | — | — |
|  | P-14 | — | — | — | — | — | — | — | — | — | — |
|  | P-15 | 100 | — | — | — | — | — | — | — | — | — |
| Surfactant (parts by weight) | DBE821 | 0.05 | — | — | — | — | — | — | — | — | 6 |
|  | DBE621 | — | — | — | — | — | — | — | — | — | — |
|  | DBE714 | — | — | — | — | — | — | — | — | — | — |
|  | DBE224 | — | — | — | — | — | — | — | — | — | — |
|  | Polyflow | — | — | — | — | — | — | — | — | — | — |
|  | BYK313 | — | — | — | — | — | — | — | — | — | — |
|  | F171 | — | — | — | — | — | — | — | — | 0.2 | — |
| Silane coupling agent (parts by weight) | BT | — | — | — | — | — | — | — | — | — | — |

The abbreviations of the silicon-based surfactants and silage coupling agent in Table 2 respectively have the meanings indicated below. A "-" sign in these columns indicates that the component corresponding to that column was not used.
[Surfactants]
(Silicone-based Surfactants)
DBE-821: trade name, Gelest Inc.
DBE-621: trade name, Gelest Inc.
DBE-714: trade name, Gelest Inc.
DBE-224: trade name, Gelest Inc.
Polyflow: Polyflow KL-100, Kyoei Chemical Co., Ltd.
BYK313: trade name, Byk-Chemie Japan, K.K.
(Fluorine-Based Surfactant)
F171: trade name, Megaface F171, DIC Corp.
[Silane Coupling Agent]
BT: Silane coupling agent represented by the following formula.

[Chemical Formula 20]

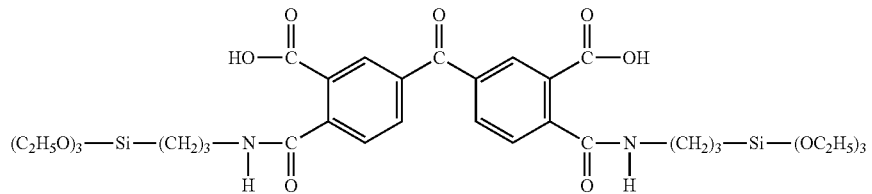

TABLE 3

| | Color | | YI value | | Laser |
|---|---|---|---|---|---|
| | unevenness at support site | Residual stress | Average | Difference between max and min | separation energy (mJ/cm$^2$) |
| Example 1 | B | B | 11 | 0.9 | 175 |
| Example 2 | A | A | 8 | 0.8 | 180 |
| Example 3 | A | A | 8 | 0.7 | 180 |
| Example 4 | A | A | 7 | 0.5 | 200 |
| Example 5 | A | A | 6 | 0.4 | 220 |
| Example 6 | B | B | 6 | 0.5 | 240 |
| Example 7 | A | A | 8 | 0.5 | 175 |
| Example 8 | A | A | 7 | 0.4 | 170 |
| Example 9 | A | A | 8 | 0.5 | 180 |
| Example 10 | A | A | 7 | 0.4 | 170 |
| Example 11 | A | A | 7 | 0.4 | 180 |
| Example 12 | A | A | 8 | 0.5 | 180 |
| Example 13 | A | A | 7 | 0.5 | 180 |
| Example 14 | A | A | 8 | 0.6 | 190 |
| Example 15 | A | A | 8 | 0.6 | 180 |
| Example 16 | A | A | 8 | 0.5 | 180 |
| Example 17 | A | A | 8 | 0.6 | 180 |
| Example 18 | A | A | 8 | 0.5 | 180 |
| Example 19 | A | A | 8 | 0.6 | 180 |
| Example 20 | A | A | 7 | 0.6 | 180 |
| Example 21 | A | A | 8 | 0.6 | 180 |
| Comp. Ex. 1 | C | A | 8 | 2.2 | 180 |
| Comp. Ex. 2 | C | A | 8 | 2.5 | 180 |
| Comp. Ex. 3 | C | A | 7 | 2.2 | 200 |
| Comp. Ex. 4 | C | A | 6 | 2.1 | 220 |
| Comp. Ex. 5 | D | A | 6 | 2.9 | 240 |
| Comp. Ex. 6 | C | A | 8 | 2.6 | 175 |
| Comp. Ex. 7 | C | A | 7 | 2.5 | 170 |
| Comp. Ex. 8 | D | A | 15 | 3.2 | 180 |
| Comp. Ex. 9 | D | A | Unable to be evaluated | Unable to be evaluated | 180 |

INDUSTRIAL APPLICABILITY

The polyimide film and laminate produced using the resin composition of the present invention can be preferably used as, for example, a semiconductor insulting film, TFT-LCD insulating film or electrode protective film, as well as a substrate of a flexible device. A flexible device refers to, for example, a flexible display, flexible solar cell, flexible touch panel electrode substrate, flexible illumination or flexible battery.

The invention claimed is:

1. A resin composition, comprising:
   (a) 100 parts by weight of a polyimide precursor containing both of the structural units respectively represented by the following formula (2) and formula (3), in which the molar ratio of the structural unit represented by formula (2) to the structural unit represented by formula (3) in the polyimide precursor of (a) is from 90:10 to 50:50:

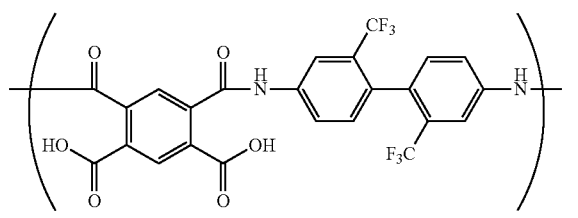

(2)

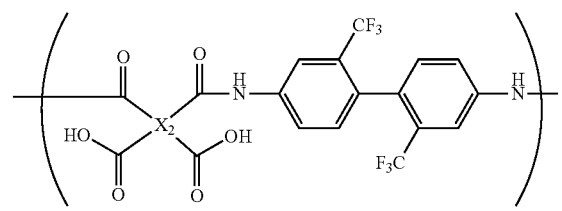

(3)

wherein X$_2$ represents a tetravalent organic group having 4 to 32 carbon atoms, except for the case in which X$_2$ represents a tetravalent organic group derived from pyromellitic dianhydride,
   (b) 0.001 parts by weight to 5 parts by weight of a silicone-based surfactant; and
   (c) an organic solvent.

2. The resin composition according to claim 1, wherein X$_2$ in formula (3) represents a tetravalent organic group derived from at least one type of compound selected from the group consisting of 4,4'-(hexafluoroisopropylidene)diphthalic anhydride, 3,3',4,4'-biphenyltetracarboxylic dianhydride and 4,4'-oxydiphthalic dianhydride.

3. The resin composition according to claim 1, wherein $X_2$ in formula (3) represents a tetravalent organic group derived from 4,4'-(hexafluoroisopropylidene)diphthalic anhydride.

4. The resin composition according to claim 1, wherein the silicon-based surfactant of (b) has a structural unit represented by the following formula (6):

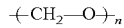 (6)

wherein n represents an integer of 1 to 5.

5. The resin composition according to claim 1, wherein the organic solvent of (c) contains a compound having a boiling point within the range of 170° C. to 270° C.

6. The resin composition according to claim 1, wherein the organic solvent of (c) contains a compound having a vapor pressure at 20° C. of 250 Pa or less.

7. The resin composition according to claim 1, wherein the organic solvent of (c) contains at least one type of compound selected from the group consisting of N-methyl-2-pyrrolidone, γ-butyrolactone and compounds represented by the following formula (7):

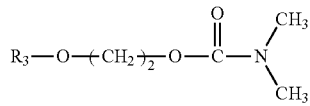 (7)

wherein $R_3$ represents a methyl group or n-butyl group.

8. The resin composition according to claim 1, further containing (d) an alkoxysilane compound.

9. A method for producing a resin film, comprising:
coating the resin composition according to claim 1 on the surface of a substrate,
drying the coated resin composition and removing the solvent,
heating the substrate and the resin composition following drying to imidate a resin precursor contained in the resin composition and form a polyimide resin film, and
separating the polyimide resin film from the substrate.

10. The method for producing a resin film according to claim 9, wherein the separation comprises irradiating the substrate side with a laser followed by separating the polyimide resin film from the substrate.

11. A method for producing a laminate, comprising:
coating the resin composition according to claim 1 onto the surface of a substrate, and
heating the substrate and the resin composition to imidate the resin precursor contained in the resin composition and form a polyimide resin film.

12. A method for producing a display substrate, comprising:
coating the resin composition according to claim 1 onto a substrate,
heating the coated resin composition to form a polyimide resin film,
forming an element or circuit on the polyimide resin film, and
separating the polyimide resin film having the element or circuit formed thereon from the substrate.

* * * * *